United States Patent
Stepanek et al.

(10) Patent No.: US 8,061,018 B2
(45) Date of Patent: Nov. 22, 2011

(54) MACHINE FOR ASSEMBLING FLUID LEVEL SENDERS

(75) Inventors: Gregory Philip Stepanek, Grand Haven, MI (US); Nicholas Frank DeVille, Muskegon, MI (US)

(73) Assignee: Medallion Instrumentation Systems LLC, Spring Lake, MI (US)

( * ) Notice: Subject to any disclaimer, the term of this patent is extended or adjusted under 35 U.S.C. 154(b) by 1026 days.

(21) Appl. No.: 11/948,234

(22) Filed: Nov. 30, 2007

(65) Prior Publication Data

US 2009/0139083 A1    Jun. 4, 2009

(51) Int. Cl.
*B23P 19/00* (2006.01)
*B23P 19/04* (2006.01)
*B21D 39/00* (2006.01)

(52) U.S. Cl. ............... 29/700; 29/464; 29/466; 29/467; 29/469; 29/559; 29/711; 29/759; 29/760; 29/281.1; 29/281.4; 29/281.5; 269/289 R

(58) Field of Classification Search ............ 29/464, 29/465, 466, 467, 468, 469, 525, 700, 711, 29/729, 759, 760, 784, 787, 791, 795, 799, 29/281.1, 281.3, 281.4, 281.5, 559, 281.2; 269/289 R, 291
See application file for complete search history.

(56) References Cited

U.S. PATENT DOCUMENTS

| | | | |
|---|---|---|---|
| 2,651,200 A | 9/1953 | Colburn | |
| 2,680,975 A | 6/1954 | Goldsmith | |
| 3,724,053 A | 4/1973 | Finkel et al. | |
| 4,330,924 A | 5/1982 | Kushner et al. | |
| 4,928,526 A | 5/1990 | Weaver | |
| 6,128,814 A * | 10/2000 | Belka et al. | 29/407.08 |
| 6,408,504 B2 * | 6/2002 | Yamaoka et al. | 29/709 |
| 6,637,737 B1 * | 10/2003 | Beecherl et al. | 269/71 |
| 2004/0249476 A1 | 12/2004 | Patz et al. | |
| 2005/0284220 A1 | 12/2005 | Cotton et al. | |
| 2006/0207324 A1 | 9/2006 | Ross, Jr. | |
| 2007/0033795 A1 * | 2/2007 | McCaffrey et al. | 29/464 |

* cited by examiner

*Primary Examiner* — Jermie Cozart
(74) *Attorney, Agent, or Firm* — Warner Norcross & Judd LLP

(57) ABSTRACT

A machine is provided for making a fluid level sender assembly having a first mounting member with a flange and a fluid level sender including a second mounting member that telescopically connects with the first mounting member. The machine has a base, a holding member to support the first mounting member, a head member having an outer ring configured to rotate the flange, the head member moving between a first and second position to allow placing the first mounting member on the holding member and a second position to allow the outer ring to rotate the flange and a sensor receiving member to engage the fluid level sender. The sensor receiving member may move with respect to the holding member to telescopically position the fluid level sender and the plurality of different longitudinal positions such that a plurality of differently sized fluid level sender assemblies can be constructed.

19 Claims, 6 Drawing Sheets

MACHINE FOR ASSEMBLING FLUID LEVEL SENDERS

BACKGROUND OF THE INVENTION

1. Field of the Invention

The field of this invention relates to machines for assembling fluid level senders.

2. Background Art

Some new fluid level senders have a support member that is telescopically connected with a mounting member and which, prior to being affixed to the mounting member, may be adjusted to any length and to any angular orientation with respect to the mounting member. Such a universally adjustable fluid level sender assembly may be useful because it allows a manufacturer to tailor a fluid level sender assembly to the varying dimensions of a plurality of different fluid containers, thus avoiding the need to keep in stock a plurality of differently configured fluid level sender assemblies. What is needed is a machine that can configure and orient the various components of the fluid level sender assembly and then affix them to one another. This and other problems are addressed by the present invention.

SUMMARY OF THE INVENTION

In a first aspect of the invention, an apparatus is provided. In a first embodiment, a machine is disclosed for making a fluid level sender assembly having a first mounting member having a flange, and a fluid level sender having a second mounting member telescopically connected with the first mounting member. The machine includes a base. A proximal holding member may be supported by the base and may be configured to support a portion of the first mounting member proximate the flange. A head member may be supported by the base and may be configured to engage and rotate the flange to a plurality of different angular orientations. The head member may be configured to move with respect to the proximal holding member between a first position that is spaced apart from the holding member to allow the first mounting member to be placed on the holding member and a second position that is proximate the holding member to permit engagement and rotation of the flange. A sender receiving member may be supported by the base and may be configured to receive the fluid level sender and to move with respect to the holding member to telescopically position the second mounting member with respect to the first mounting member.

In at least one implementation of the first embodiment, the machine may further include a distal holding member that may be configured to support the first mounting member at a position that is spaced apart from the flange. The distal holding member may be further configured to move between a plurality of positions disposed at a plurality of different distances from the proximal holding member to accommodate differently sized mounting members. The distal holding member may include a distal crimping apparatus for crimping the first and the second mounting members proximate their telescopic connection. In some applications, the crimping apparatus may include a dimple crimper. In other applications, the proximal holding member may include a proximal crimping apparatus for crimping the first and the second mounting members proximate the flange.

In at least another implementation of the first embodiment, the machine may further comprise a flange rotation motor for controlling rotation of the flange, a head member motor for controlling movement of the head member between the first and the second positions and a sender receiving member motor for controlling movement of the sender receiving member. In at least one variation of this implementation, the flange rotation motor, the head member motor, and the sender receiving member motor may each be stepper motors. In at least another variation of this implementation, the machine may further comprise a data processor and a data storage device containing data defining the configurations of a plurality of differently configured fluid level sender assemblies. The data may include a length of the fluid level sender assembly and an angular orientation of the flange with respect to the fluid level sender. The data processor may be in communication with the data storage device and the data processor may control the operation of the flange rotation motor, the head member motor, and the sender receiving member motor using the data stored in the data storage device to assemble one of a plurality of differently sized fluid level sender assemblies. In a further variation, the machine may further comprise a bar code reader that is in communication with the data processor to read bar codes on the first mounting member and the fluid level sender and to transmit the respective bar codes to the data processor.

In at least another implementation of the first embodiment, the fluid level sender assembly may further include an electric connector. In this implementation, the head member may be further configured to engage and rotate the electric connector to a plurality of different angular orientations independently of the head member's rotation of the flange. The head member may also seat the electric connector on the flange as the head member moves towards the second position. In at least one variation of this implementation, the head member is configured to rotate the electric connector up to 360 degrees.

In another variation of this implementation, the head member may be reconfigured to permit engagement with a plurality of differently sized and differently configured connector tools to allow for the assembly of fluid level sender assemblies having a plurality of differently sized and differently configured electric connectors.

In at least another implementation of the first embodiment, the sender receiving member may be removable. The base may be able to support a plurality of differently sized and differently configured sender receiving members to allow for the assembly of fluid level sender assemblies having a plurality of differently sized and differently configured fluid level senders.

In at least another implementation of the first embodiment, the head member is configured to rotate the flange up to 360 degrees.

In still another implementation of the first embodiment, the head member may include a pin that may be configured to mate with an aperture in the flange to facilitate alignment of the flange.

In at least a second embodiment, a machine is disclosed for making a fluid level sender assembly having an electric connector, a first mounting member having a flange and a fluid level sender having a second mounting member telescopically connected with the first mounting member. The machine includes a base. A first holding member may be supported by the base and may be configured to support an assembly of the electric connector and the first mounting member. The first holding member may receive the first mounting member proximate the flange. A second holding member may be configured to support the first mounting member at a position that is spaced apart from the flange and may be further configured to move between a plurality of positions disposed at a plurality of different distances from the first holding member to accommodate differently sized first mounting members. A head member may be supported by the base and may have an outer ring and a connector tool. The outer ring may be configured to receive and rotate the flange to a plurality of different angular orientations. The connector tool may be configured to receive and rotate the electric connector to a plurality of different angular orientations. The outer ring may be further configured to rotate the flange independently of the electric connector and the connector tool may be further configured to rotate the electric connector independently of the outer ring. The head member may be configured to move with respect to the holding member between a first position that is spaced apart from the first holding member to allow the assembly of the electric connector and the first mounting member to be placed on the first holding member and a second position that is proximate the first holding member to allow the outer ring to receive and to rotate the flange and to allow the connector tool to receive and to rotate the electric connector and also to seat the electric connector on the flange. A sender receiving member may be supported by the base and may be configured to receive the fluid level sender and to move with respect to the first holding member to telescopically position the fluid level sender in a plurality of different longitudinal positions with respect to the first mounting member such that a plurality of differently sized fluid level sender assemblies can be constructed. An outer ring motor may be provided for controlling rotation of the outer ring. A connector tool motor may be provided for controlling rotation of the connector tool. A head member motor may be provided for controlling movement of the head member between the first and the second positions. A second holding member motor may be provided for controlling movement of the second holding member. And a sender receiving member motor may be provided for controlling movement of the sender receiving member.

In at least one implementation of the second embodiment, the first holding member may include a crimping apparatus to crimp the first and the second mounting members together proximate the flange. The second holding member may include a crimping apparatus to crimp the first and the second mounting members together at a position spaced apart from the flange. In at least one variation of this implementation, the machine may further comprise a data processor and a data storage device containing data defining the dimensions and the configurations of a plurality of differently sized fluid level sender assemblies including a length of the fluid level sender assembly, an angular orientation of the flange with respect to the fluid level sender, and an angular orientation of the electric connector with respect to the fluid level sender. The data processor may be in communication with the data storage device. The data processor may control the operation of the outer ring motor, the connector tool motor, the second holding member motor, the head member motor, and the sender receiving member motor using the data stored in the data storage device to construct one of a plurality of differently sized fluid level sender assemblies. In a further variation, the sender receiving member may be mounted on the second holding member and may be configured to move with respect to the second holding member between a plurality of different positions to telescopically position the fluid level sender with respect to the first mounting member.

In another aspect of the invention, a method for using a machine that can construct a plurality of differently sized and configured fluid level sender assemblies is disclosed. The machine may have a base, a holding member supported on the base, a head member supported on the base and movable with respect to the holding member, a sender receiving member supported on the base and movable with respect to the holding member, a plurality of motors to move the head member, the sender receiving member, and to orient the fluid level sender assemblies, a data processor and data storage device containing data defining the dimensions and configurations of a plurality of differently sized fluid level sender assemblies, the fluid level sender assembly having an electric connector, a first mounting member having a flange and a fluid level sender having a second mounting member telescopically connected with the first mounting member. In a third embodiment of the invention, the method may include using the data processor to select one of the plurality of differently sized fluid level sender assemblies from the data storage device for manufacture. Place a loose assembly of the electric connector, the first mounting member, and the fluid level sender in the machine such that the holding member receives the first mounting member and the electric connector and such that the sender receiving member receives the fluid level sender. Activate the machine to orient the electric connector with respect to the fluid level sender, to seat the electric connector onto the flange, to orient the flange with respect to the fluid level sender, and to telescopically slide the fluid level sender with respect to the first mounting member. Once the fluid level sender assembly has been configured and oriented, the fluid level sender is affixed to the first mounting member.

DETAILED DESCRIPTION OF THE ILLUSTRATED EMBODIMENT(S)

Figure 1:
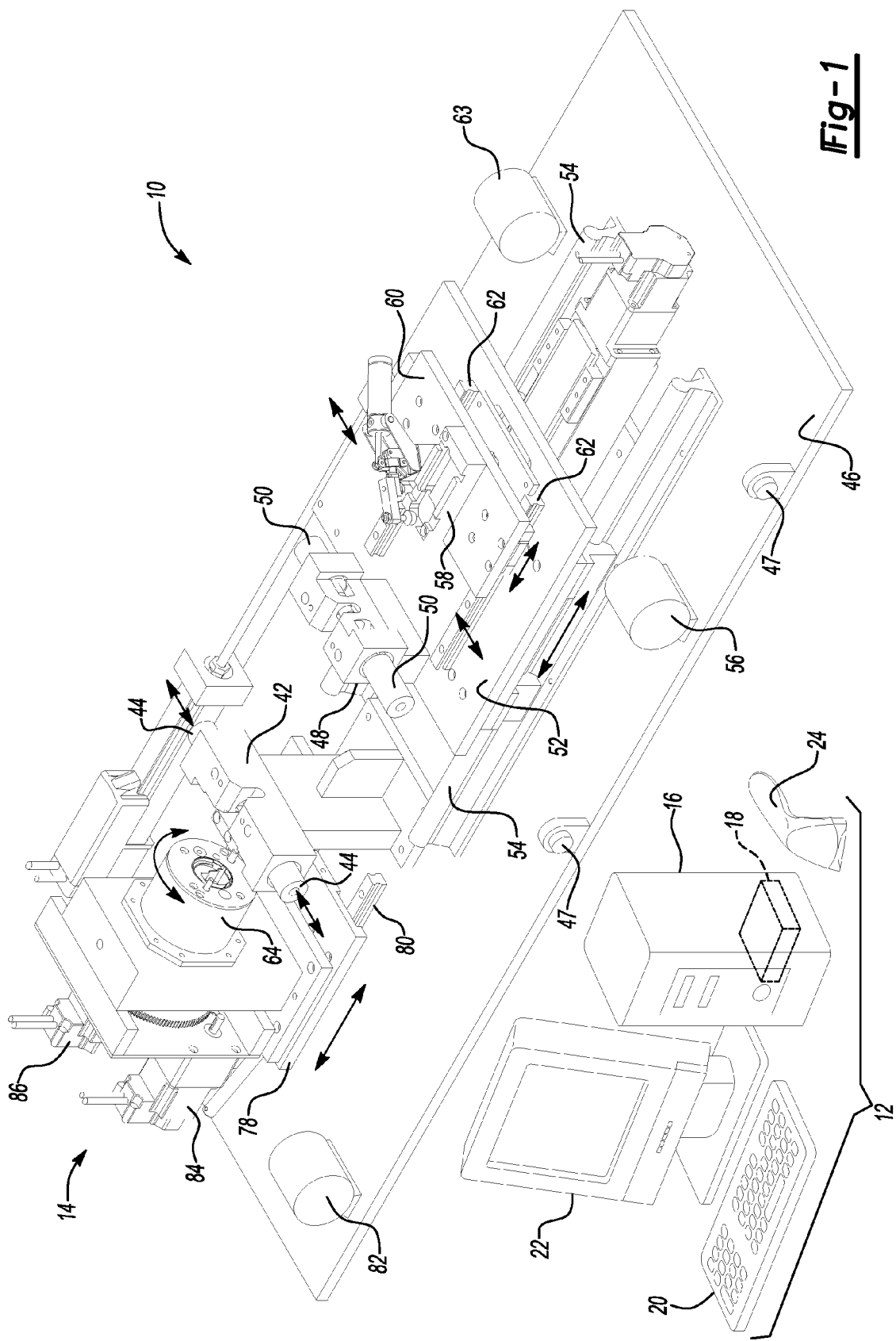
FIG. 1 is a perspective view of a system for assembling fluid level senders.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. In some instances, more than one embodiment of an invention is illustrated and described. Parts and components of the additional embodiments that are similar or identical in function to corresponding parts of a first embodiment will be given the same reference numerals as those given to the first embodiment, but with either a prime notation or a letter designator after the reference numeral.

With reference to FIG. 1, a system 10 for assembling fluid level sender assemblies is illustrated. System 10 includes a computer subsystem 12 and an embodiment of a machine 14 for assembling fluid level sender assemblies.

Computer subsystem 12 includes a cabinet 16 which includes a data storage device 18 such as a hard drive for storing electronic data. Cabinet 16 may also include a central processing unit (not shown). Computer subsystem 12 further includes a keyboard 20 to allow a user to interact with computer subsystem 12. Computer subsystem 12 further includes a monitor 22 which facilitates user interaction with computer subsystem 12. Computer subsystem 12 further includes a bar code reader 24 which can be used by a reader to scan bar codes and which may communicate bar code data to computer subsystem 12.

Figure 2:
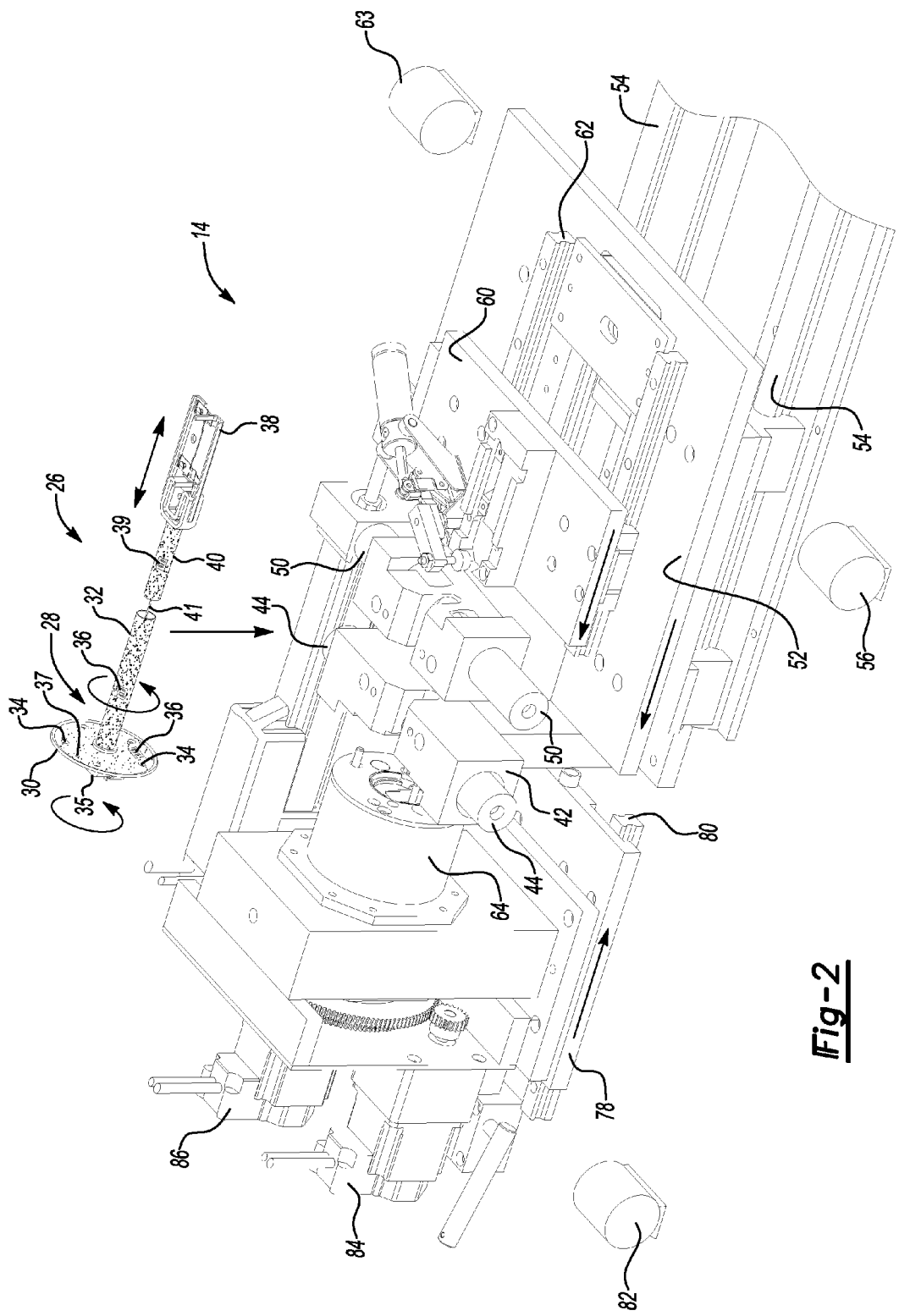
FIG. 2 is a fragmented perspective view of a machine for assembling fluid level senders in an "open" configuration ready to receive a loosely assembled fluid level sender.

Machine 14 may be used to orient and configure various components of fluid level sender assembly 26 (see FIG. 2) and to affix the various components to one another in a configuration that accommodates any of a plurality of fluid tanks. Data storage device 18 may include dimensional and configuration data for a plurality of differently configured fluid tanks. Once a user selects a particular fluid tank, fluid level sender assembly 26 may be oriented and configured by machine 14 to be compatible with that fluid tank.

Fluid level sender assembly 26 includes a first mounting member 28 including a flange 30 and a first mounting portion 32. Flange 30 includes a plurality of flange apertures 34 which may correspond in orientation with apertures in the fluid tank to which fluid level sender assembly 26 is to be mounted. Flange 30 further includes orientation aperture 37 which has a narrower diameter than flange aperture 34. Orientation aperture 37 may be used to align flange 30 with respect to other components of fluid level sender 26. Flange 30 also includes a bar code 36. Alternatively, bar code 36 may be disposed on a surface of the first mounting portion 32. For some applications, bar code 36 may be disposed on both flange 30 and first mounting portion 32. Bar code 36 corresponds to particular dimensions of the component it is attached to. For example, a first mounting member 28 having a first flange diameter and a first mounting portion length will have a first bar code. A second mounting member 28' having a second flange diameter and a second mounting portion length will have a second bar code, and so on.

Fluid level sender assembly 26 further includes a fluid level sender 38 having a second mounting member 40. Second mounting member 40 fits telescopically with first mounting portion 32 of first mounting member 28. When second mounting member 40 and first mounting member 26 are telescopically connected, both the overall length of fluid level sender assembly 26 and the angular orientation of fluid level sender 38 with respect to first mounting member 28 may be adjusted. Fluid level send 38 includes a bar code 39 that corresponds to its dimensions in the same manner discussed above with respect to first mounting member 28.

Fluid level sender assembly 26 further includes electrical connector 35. Electrical connector 35 is mounted to fluid level sender assembly 26 in an aperture in flange 30. In some embodiments, electrical connector 35 includes gaskets and/or other fittings made of rubber or other polymeric materials to form a substantially fluid-tight fit with respect to flange 30. Electrical connector 35 is electrically connected to fluid level sender 38 by a wire 41 running through a cavity extending substantially the entire length of fluid level sender assembly 26. Wire 41 carries electrical signals from fluid level sender 38 to electrical connector 35 which, through connections with other components (not shown) can communicate the fluid level within the fluid tank to a user read-out or other device. Prior to seating electrical connector 35 in the aperture in flange 30, electrical connector 35 may rotate to any desirable angular orientation with respect to flange 30 and also with respect to fluid level sender 38. Once electrical connector 35 is seated within the aperture in flange 30, it is substantially immobilized. Electrical connector 35 may include a bar code (not shown) to correspond with the make and model of electrical connector utilized.

Machine 14 includes a first or proximal holding member 42 configured to hold the first mounting member 28 proximate flange 30. Proximal holding member 42 includes a first or proximal crimping apparatus 44. Arrows indicate the direction of movement of proximal crimping apparatus 44, moving inward to crimp fluid level sender assembly 26 and outward to release it. While proximal crimping apparatus 44 is a dimple crimper, in other embodiments, other types of crimping apparatus may be used. In still other embodiments, a different type of apparatus or machinery may be used to permanently affix the first mounting member 28 to fluid level sender 38.

Proximal holding member 42 is mounted in a substantially immovable position on base 46. Base 46 may be made of any substantially rigid and durable material capable of supporting the various components of machine 14 throughout its operation. Touch switches 47 may be mounted on base 46 and may be used to operate/actuate machine 14.

Machine 14 further includes a second or distal holding member 48 which is configured to hold a portion of first mounting portion 32 spaced apart from flange 32. Distal holding member 48 includes a second or distal crimping apparatus 50. Second or distal crimping apparatus 50 moves in an inward and outward direction as indicated by arrows in FIG. 1 and is capable of imparting a crimp to the fluid level sender assembly 26 at a second location for the purpose of immobilizing first mounting member 28 with respect to fluid level sender 38. Distal holding member 48 is mounted on second or distal holding member platform 52 which is slidably mounted on second or distal holding member rails 54 which are mounted to base 46. Distal holding member platform 52 may slide towards and away from proximal holding member 42 to allow distal holding member 48 to be positioned to accommodate a plurality of different first mounting members 28 having a plurality of different lengths. A second or distal holding member motor 56 may be used to move second or distal holding member platform 52 towards and away from proximal holding member 42. Distal holding member motor 56 may be connected to distal holding member platform 52 by any means effective to move distal holding member platform 52 towards and away from proximal holding member 42 including a chain drive or any other linkage effective to move distal holding member platform 52.

Machine 14 further includes a sender receiving member 58 configured to receive a fluid level sender such as fluid level sender 38. In some embodiments of machine 14, sender receiving member 58 is interchangeable with other sender receiving members that are configured to receive differently configured fluid level senders. Sender receiving member 58 is mounted on sender receiving member platform 60 which is slidably mounted on sender receiving member rails 62 which are mounted to distal holding member platform 52. Configured in this manner, sender receiving member platform 60 may slide towards and away from distal holding member 48. Sender receiving member motor 63 may move sender receiving member platform 60 along sender receiving member rails 62. When fluid level sender 38 is positioned in sender receiving member 58, and when first mounting member 28 is positioned in distal holding member 48, as sender receiving member platform 60 moves towards distal holding member 64, second mounting member 40 telescopically slides with respect to first mounting portion 32 and the overall length of fluid level sender assembly 26 can be tailored to desired dimensions.

In the illustrated embodiment, sender receiving member 58 and distal holding member 48 are mounted to platforms. It should be understood by those of ordinary skill in the art that in other embodiments other apparatus may be used to slidably mount sender receiving member 58 and distal holding member 48 to their respective rails. In still other embodiments, sender receiving member 58 and distal holding member 48 may be configured to mount directly to their respective rails without any intervening apparatus. In still other embodiments, sender receiving member 58 and distal holding member 48 may be mounted on drive systems other than rails which moves sender receiving member 58 and distal holding member 48 in the indicated directions. Such alternative apparatus do not depart from the teachings of the present invention.

Figure 7:
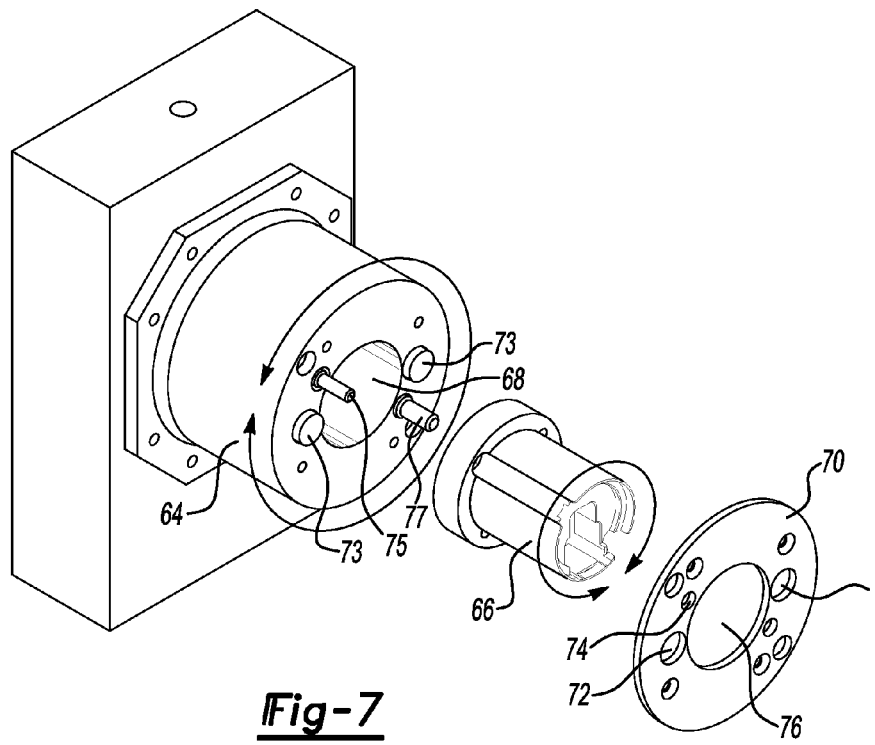
FIG. 7 is an exploded view illustrating various components of the machine of FIG. 6.

Machine 14 further includes a head member 64 capable of configuring and orienting electrical connector 35 and flange 30. Some of the details of head member 64 can be more easily seen in FIG. 7. Head member 64 includes a connector tool 66 which is configured to receive and engage electrical connector 35. In some embodiments of machine 14, connector tool 66 may be interchangeable with other connector tools which are configured to receive differently shaped and/or dimensioned electrical connectors. Connector tool 66 is capable of 360° rotation which allows an operator to orient electrical connector 35 at a desirable angular orientation with respect to fluid level sender 38. Connector tool 66 resides within a connector tool aperture 68 within head member 64 and is rotatable therewith. Head member 64 further includes a pin 75 and a larger diameter pin 77, a pair of bosses 73 and an outer ring 70 which is configured to engage flange 30. Outer ring 70 includes boss apertures 72 which are configured to receive bosses 73 protruding from a surface of head member 64. In some embodiments, bosses 73 are magnetic and can hold flange 30 substantially flush against outer ring 70 as the various components of machine 14 move and reconfigure the various components of fluid level sender assembly 26. Outer ring 70 further includes pin apertures 74 to receive pins 75 and 77 protruding from an outer surface of head member 64. In the illustrated embodiment, pin 75 has a diameter which corresponds with the diameter of orientation aperture 37. Larger diameter pin 77 has a diameter which corresponds with the diameter of flange apertures 34. In this manner, flange 30 can only be positioned on head member 64 in a single orientation. In other embodiments, alternative means of orienting flange 30 may be employed. Outer ring 70 also includes an electrical connector access aperture 76 which permits connector tool 66 to engage electrical connector 35 when outer ring 70 is mounted to head member 64. Head member 64 and outer ring 70 are capable of 360 degrees rotation which allows an operator to orient flange 30 at a desirable angular orientation with respect to fluid level sender 38. In the illustrated embodiment, connector tool 66 and outer ring 70 are capable of rotating independently with respect to one another.

Head member 64 is mounted on head member platform 78 which is slidably mounted on head member rails 80 which are mounted to base 46. This arrangement permits head member 64 to move towards and away from proximal holding member 42. In the illustrated embodiment, head member motor 82 is configured to move head member platform 78 towards and away from proximal holding member 42. In another embodiment, head member platform 78 may be moved manually or by any other means effective to move head member 64 towards and away from proximal holding member 42. Head member 64 further includes outer ring motor 84 which is configured to rotate head member 64 and outer ring 70 360 degrees. Head member 64 further includes connector tool motor 86 which is connected to connector tool 66 and is capable of rotating connector tool 66 360 degrees. In some embodiments, outer ring motor 84 and connector tool motor 86 may rotate outer ring 70 and connector tool 66 greater than or less than 360 degrees. In some embodiments, outer ring motor 84 and connector tool motor 86 may comprise stepper motors. In other embodiments, other types of motors effective to rotate outer ring 70 and connector tool 66 respectively may be employed.

Operation of machine 14 will now be addressed. An operator will use computer system 12 to select a desired configuration of a fluid level sender assembly from a plurality of different configurations stored in data storage device 18. Such configuration will correspond with one or more of the plurality of differently sized and configured fluid tanks to which the completed fluid level sender assembly may be attached. A user may then use bar code reader 24 to scan mount bar code 36, sender bar code 39 and a bar code associated with electrical connector 35. In some embodiments, as many as four bar codes may be required for operation of machine 14 including a bar code associated with a part number, a part revision level, a connector tool identification number, and a sender tool identification number.

When a desired configuration is selected from the plurality of configurations stored in data storage device 18, the various components of machine 14 may automatically reconfigure to accommodate a loose assembly of the various components of fluid level sender assembly 26. An operator may then insert the loose assembly into machine 14. When loosely assembled, first mounting member 28 is free to rotate with respect to fluid level sender 38. Fluid level sender 38 is free to telescope in and out with respect to first mounting member 28. Additionally, electrical connector 35 is free to rotate with respect to flange 30.

Figure 3:
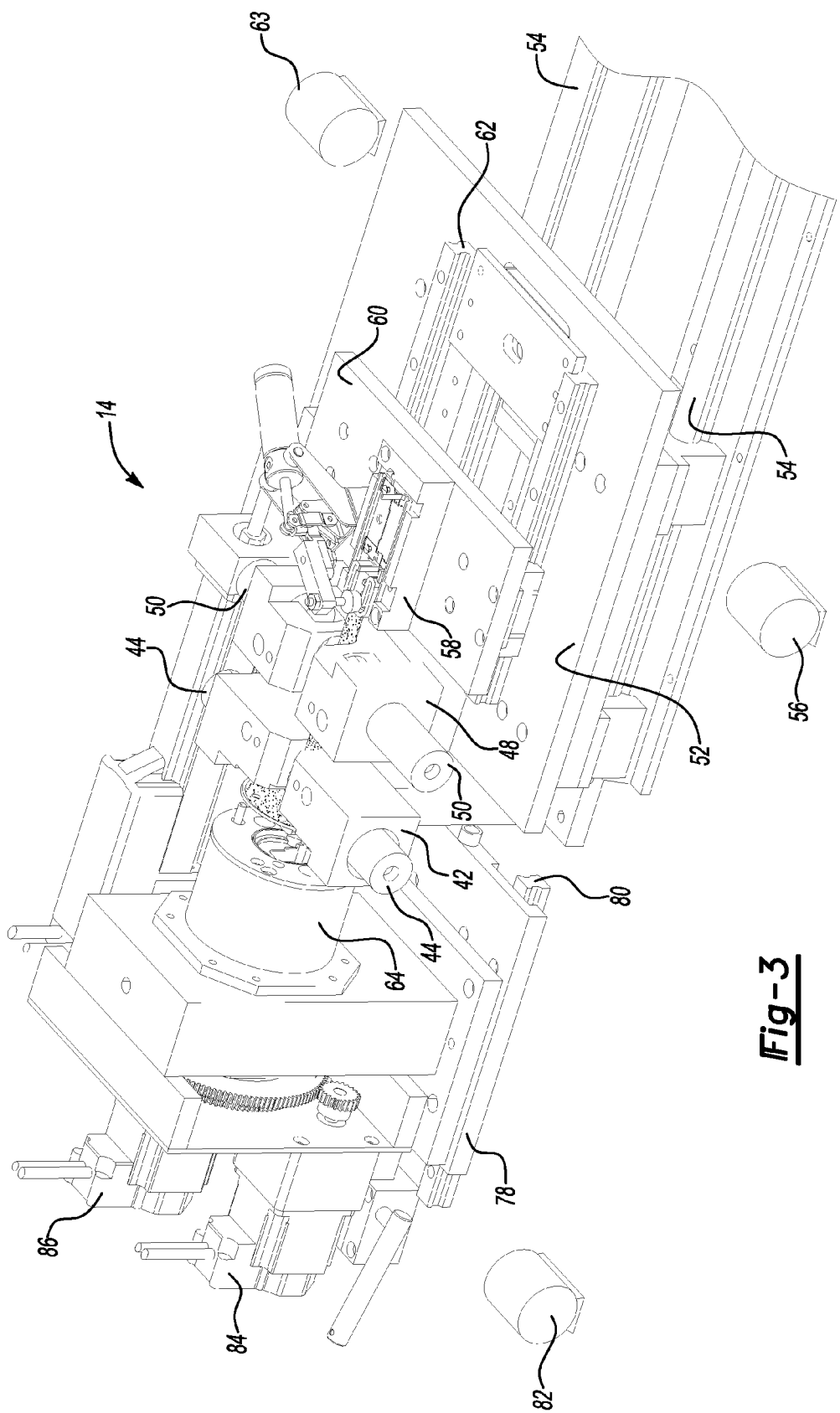
FIG. 3 is a fragmented perspective view of the machine of FIG. 2 after the fluid level sender assembly has been positioned in the machine.

A user may then position the loose assembly of fluid level sender assembly 26 in machine 14, aligning fluid level sender 38 with sender receiving member 58, placing an end of first mounting portion 32 proximate flange 30 in proximal holding member 42 and positioning a distal end of first mounting portion 32 in distal holding member 48. Electrical connector 35 may then be manually rotated to align with connector tool 66 and flange 30 may be rotated such that one of the flange apertures 34 aligns with, and is mounted on pin 75. FIG. 3 illustrates the loose assembly of fluid level sender assembly 26 positioned in machine 14 prior to actuation of machine 14.

Figure 4:
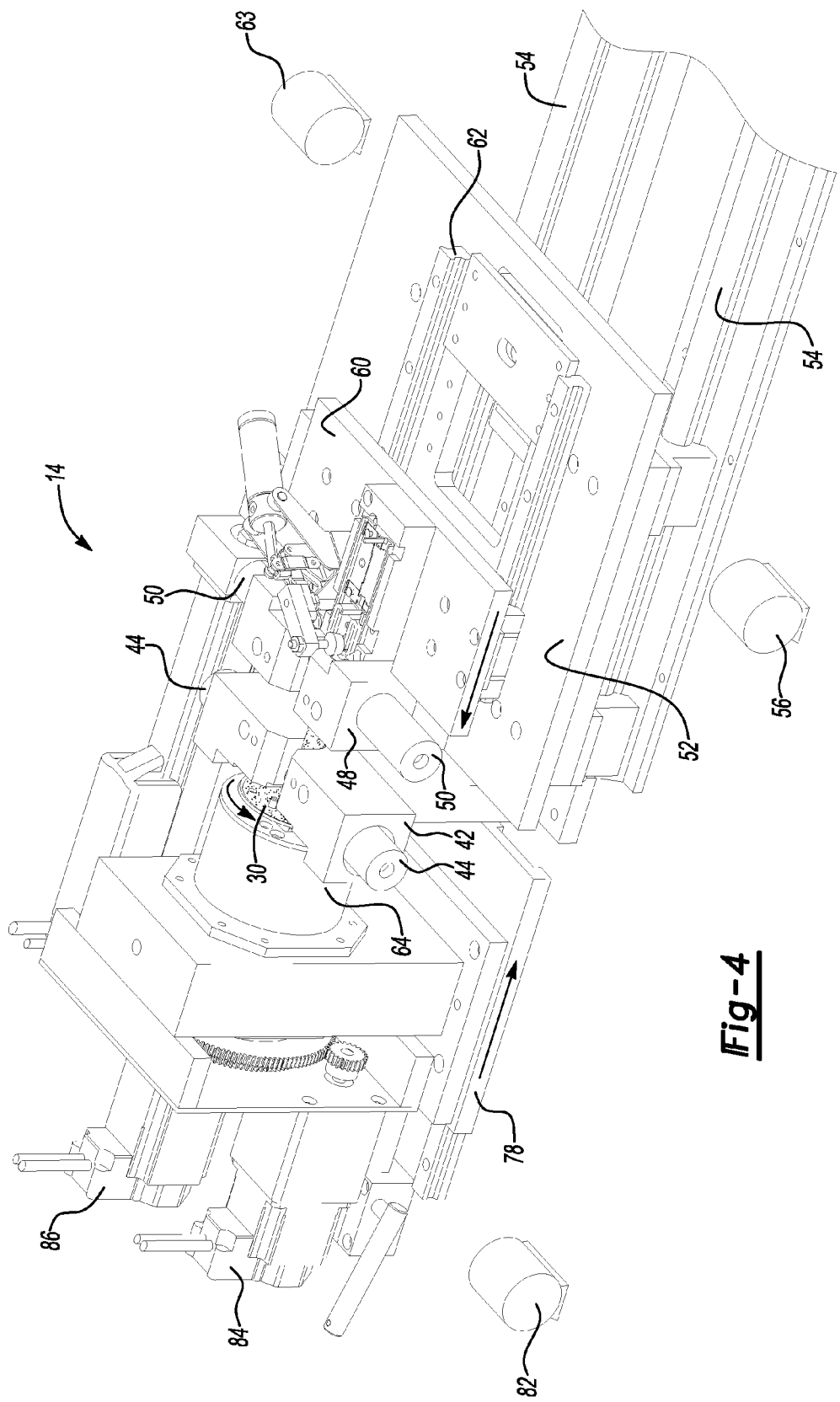
FIG. 4 is a fragmented perspective view of the machine of FIG. 3 after the machine has been activated and the various components of the fluid level sender have been re-oriented.

Once all of the bar codes have been scanned and computer subsystem 12 confirms that components corresponding to the selected configuration have been placed in machine 14, machine 14 may be actuated. In some embodiments, machine 14 is actuated by depressing touch switches 47. In other embodiments, machine 14 may be actuated using a component associated with computer sub-system 12, such as keyboard 20. Machine actuation is illustrated in FIG. 4. Upon actuation, sender receiving member motor 63 moves sender receiving member platform 60 in a direction towards distal holding member 48, thus telescopically shortening the connection between fluid level sender 38 and first mounting member 28 until the desired overall length is attained. Substantially simultaneously, head member 64 moves towards proximal holding member 42 causing connector tool 66 to engage electrical connector 35. Connector tool 66 may rotate to orient electrical connector 35 at a desired angular orientation and simultaneously push electrical connector 35 inward towards flange 30 to allow gaskets or other components of electrical connector 35 to be seated on flange 30. Substantially simultaneously, outer ring 70 may rotate to align the flange apertures 34 in a desired angular orientation with respect to fluid level sender 38. Pin 75, which engages one of flange apertures 34, facilitates rotation of flange 30 to the desired angular orientation.

Once electrical connector 35, flange 30 and fluid level sender 38 have been moved into the configuration selected by the operator, proximal crimping apparatus 44 and distal crimping apparatus 50 crimp first mounting portion 32 in two separate locations to ensure that flange 30 is substantially immobilized with respect to fluid level sender 38. Electrical connector 35 is substantially immobilized with respect to flange 30 through an interference fit between a gasket or seal of electrical connector 35 and an opening in flange 30. In some embodiments, only a single dimple crimp may be imparted to the fluid level sender assembly 26 to immobilize the components with respect to one another. In other embodiments, other methods of affixing the various components of fluid level sender assembly 26 may be employed, such as the use of threaded fasteners, self tapping threaded fasteners, and the like.

Figure 5A:
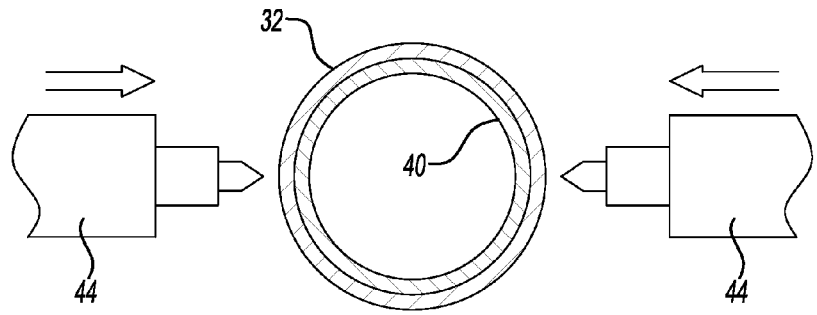
FIGS. 5A and 5B are fragmented schematic views illustrating the use of the machine of FIG. 4 to crimp the fluid level sender assembly.
Figure 5B:
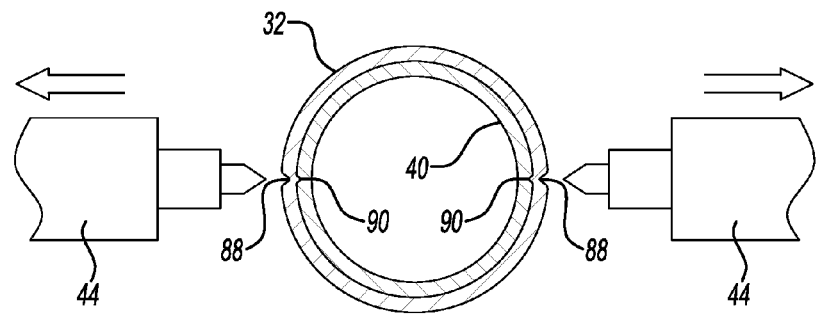

With reference to FIGS. 5A and 5B, the crimping operation is illustrated. A cross section of the loose assembly of fluid level sender assembly 26 is illustrated in FIG. 5A. First mounting portion 32 and second mounting member 40 are shown in cross section. In the illustrated embodiment, first mounting portion 32 is the outer ring and second mounting member 40 is the inner ring. In other embodiments, the configuration may be reversed with second mounting member 40 being the outer ring and first mounting portion 32 being the inner ring. Proximal crimping apparatus 44 is illustrated as moving inward toward the loose assembly of first mounting member 32 and second mounting member 40. The same process occurs at distal crimping apparatus 50. FIG. 5B illustrates the cross section of the first mounting portion 32 and the second mounting member 40 of FIG. 5A subsequent to crimping. In this illustration, the effects of crimping are illustrated. A first indentation 88 has been imparted to first mounting portion 32 which has created a second indentation 90 in an outer surface of second mounting member 40. With the crimps in place, first mounting portion 32 and second mounting member 40 are substantially immobilized with respect to one another and are no longer capable of rotating or telescopically extending or collapsing. In this manner, the overall dimensions of fluid level sender assembly 26 are substantially permanently affixed.

Figure 6:
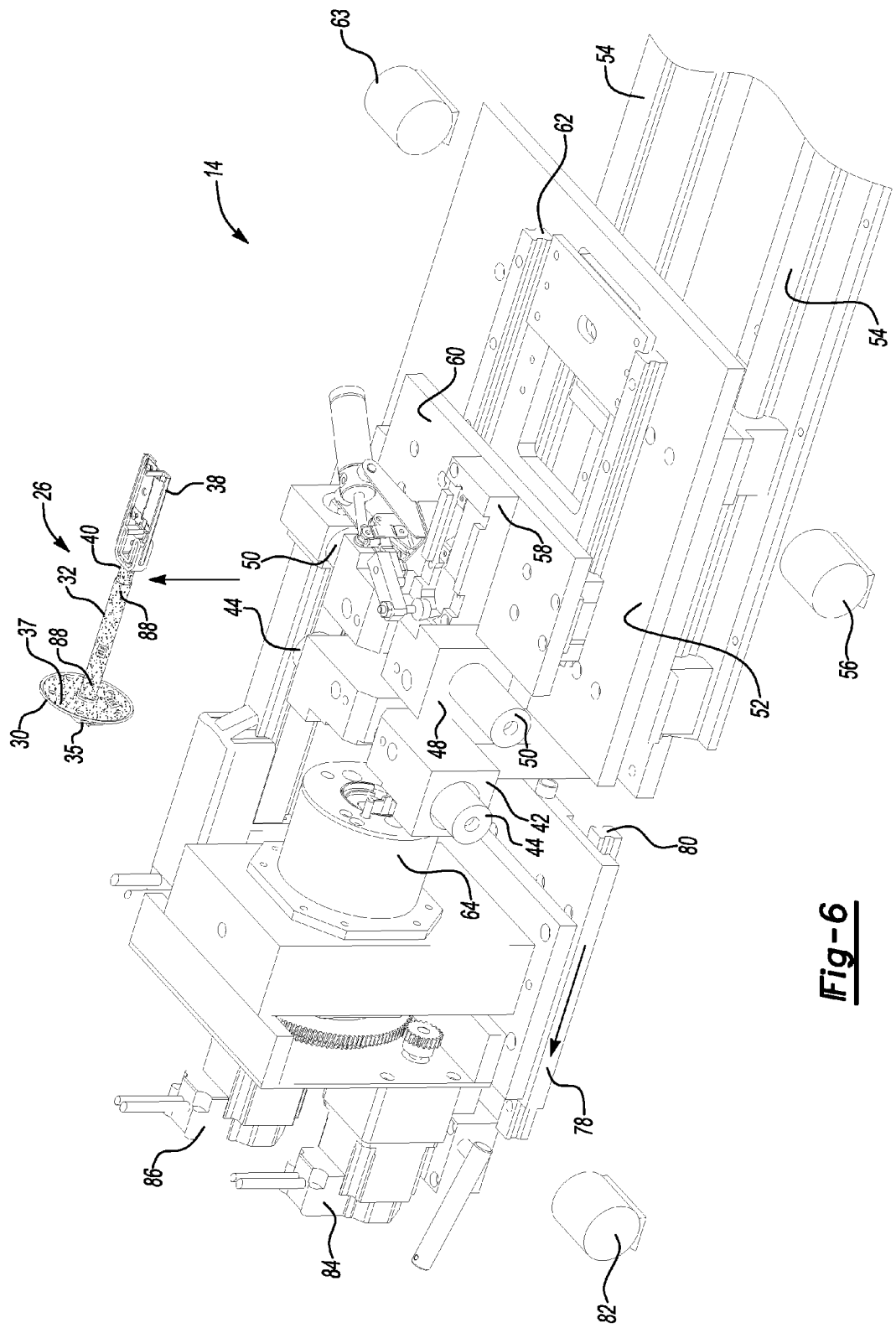
FIG. 6 is a fragmented perspective view illustrating the machine of FIG. 4 in a post activation configuration to allow removal of the assembled fluid level sender assembly.

With respect to FIG. 6, once the crimping is complete, head member 64 retracts away from proximal holding member 42 and the user may then remove the assembled fluid level sender assembly from machine 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A machine for making a fluid level sender assembly having a first mounting member having a flange and a fluid level sender having a second mounting member telescopically connected with the first mounting member, the machine comprising:
    a base;
    a proximal holding member supported by the base and configured to support a portion of the first mounting member proximate the flange;
    a head member supported by the base configured to engage and rotate the flange to a plurality of different angular orientations, the head member being configured to move with respect to the proximal holding member between a first position spaced apart from the holding member to allow the first mounting member to be placed on the holding member, and a second position proximate the holding member to permit engagement and rotation of the flange; and
    a sender receiving member supported by the base configured to receive the fluid level sender and to move with respect to the holding member to telescopically position the second mounting member with respect to the first mounting member.

2. The machine of claim 1, the machine further comprising a distal holding member configured to support the first mounting member at a position spaced apart from the flange and further configured to move between a plurality of positions disposed at a plurality of different distances from the proximal holding member to accommodate differently sized first mounting members.

3. The machine of claim 2 wherein the distal holding member includes a distal crimping apparatus for crimping the first and the second mounting members proximate their telescopic connection.

4. The machine of claim 3 wherein the crimping apparatus includes a dimple crimper.

5. The machine of claim 3 wherein the proximal holding member includes a proximal crimping apparatus for crimping the first and the second mounting members proximate the flange.

6. The machine of claim 1 further comprising a flange rotation motor for controlling rotation of the flange, a head member motor for controlling movement of the head member between the first and the second positions and a sender receiving member motor for controlling movement of the sender receiving member.

7. The machine of claim 6 wherein the flange rotation motor, the head member motor and the sender receiving member motor are each stepper motors.

8. The machine of claim 6 further comprising a data processor and a data storage device containing data defining the configurations of a plurality of differently configured fluid level sender assemblies including a length of the fluid level sender assembly and an angular orientation of the flange with respect to the fluid level sender, wherein the data processor is in communication with the data storage device and wherein the data processor controls the operation of the flange rotation motor, the head member motor and the sender receiving member motor using the data stored in the data storage device to assemble one of a plurality of differently sized fluid level sender assemblies.

9. The machine of claim 8 further comprising a bar code reader in communication with the data processor to read bar codes on the first mounting member and the fluid level sender and to transmit the respective bar codes to the data processor.

10. The machine of claim 1, the fluid level sender assembly further including an electric connector, wherein the head member is further configured to engage and rotate the electric connector to a plurality of different angular orientations independent of the head member's rotation of the flange, and the head member seating the electric connector on the flange when the head member moves towards the second position.

11. The machine of claim 10 wherein the head member is configured to rotate the electric connector up to 360 degrees.

12. The machine of claim 10 wherein the head member is reconfigured to permit engagement with a plurality of differently sized and differently configured connector tools to allow for the assembly of fluid level sender assemblies having a plurality of differently sized and differently configured electric connectors.

13. The machine of claim 1 wherein the sender receiving member is removable and wherein the base can support a plurality of differently sized and differently configured sender receiving members to allow for the assembly of fluid level sender assemblies having a plurality of differently sized and differently configured fluid level senders.

14. The machine of claim 1 wherein the head member is configured to rotate the flange up to 360 degrees.

15. The machine of claim 1, wherein the head member includes a pin that is configured to mate with an aperture in the flange to facilitate alignment of the flange.

16. A machine for making a fluid level sender assembly having an electric connector, a first mounting member having a flange and a fluid level sender having a second mounting member telescopically connected with the first mounting member, the machine comprising:
　a base;
　a first holding member supported by the base and configured to support an assembly of the electric connector and the first mounting member, the first holding member receiving the first mounting member proximate the flange;
　a second holding member configured to support the first mounting member at a position spaced apart from the flange and further configured to move between a plurality of positions disposed at a plurality of different distances from the first holding member to accommodate differently sized first mounting members;
　a head member supported by the base having an outer ring and a connector tool, the outer ring being configured to receive and rotate the flange to a plurality of different angular orientations, and the connector tool being configured to receive and rotate the electric connector to a plurality of different angular orientations, the outer ring being further configured to rotate the flange independently of the electric connector and the connector tool being further configured to rotate the electric connector independently of the outer ring, the head member being configured to move with respect to the holding member between a first position spaced apart from the first holding member to allow the assembly of the electric connector and the first mounting member to be placed on the first holding member, and a second position proximate the first holding member to allow the outer ring to receive and rotate the flange and to allow the connector tool to receive and rotate the electric connector and to seat the electric connector on the flange;
　a sender receiving member supported by the base configured to receive the fluid level sender, and to move with respect to the first holding member to telescopically position the fluid level sender in a plurality of different longitudinal positions with respect to the first mounting member such that a plurality of differently sized fluid level sender assemblies can be constructed;
　an outer ring motor for controlling rotation of the outer ring;
　a connector tool motor for controlling rotation of the connector tool;
　a head member motor for controlling movement of the head member between the first and the second positions;
　a second holding member motor for controlling movement of the second holder member; and
　a sender receiving member motor for controlling movement of the sender receiving member.

17. The machine of claim 16 wherein the first holding member includes a crimping apparatus to crimp the first and the second mounting members together proximate the flange and the second holding member includes a crimping apparatus to crimp the first and the second mounting members together at a position spaced apart from the flange.

18. The machine of claim 17 further comprising a data processor and a data storage device containing data defining the dimensions and configurations of a plurality of differently sized fluid level sender assemblies including a length of the fluid level sender assembly, an angular orientation of the flange with respect to the fluid level sender, and an angular orientation of the electric connector with respect to the fluid level sender, wherein the data processor is in communication with the data storage device, and the data processor controls the operation of the outer ring motor, the connector tool motor, the second holding member motor, the head member motor and the sender receiving member motor using the data stored in the data storage device to construct one of a plurality of differently sized fluid level sender assemblies.

19. The machine of claim 18 wherein the sender receiving member is mounted on the second holding member and is configured to move with respect to the second holding member between a plurality of different positions to telescopically position the fluid level sender with respect to the first mounting member.

* * * * *